United States Patent
Adams et al.

(10) Patent No.: US 9,081,210 B2
(45) Date of Patent: Jul. 14, 2015

(54) HEAD WORN DEVICE HAVING TEMPLE ARMS TO PROVIDE LONG AXIS COMPRESSION

(71) Applicants: Aditha May Adams, Seattle, WA (US); Joel B. Jacobs, Seattle, WA (US); Paul Bosveld, Seattle, WA (US); Joseph Juseop Park, Bellevue, WA (US); Ari Lumbantobing, Issaquah, WA (US); Henric Jentz, Seattle, WA (US); Christopher B. Fruhauf, San Anselmo, CA (US)

(72) Inventors: Aditha May Adams, Seattle, WA (US); Joel B. Jacobs, Seattle, WA (US); Paul Bosveld, Seattle, WA (US); Joseph Juseop Park, Bellevue, WA (US); Ari Lumbantobing, Issaquah, WA (US); Henric Jentz, Seattle, WA (US); Christopher B. Fruhauf, San Anselmo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 13/712,519

(22) Filed: Dec. 12, 2012

(65) Prior Publication Data

US 2014/0159995 A1    Jun. 12, 2014

(51) Int. Cl.
*G02C 5/16*    (2006.01)

(52) U.S. Cl.
CPC ... *G02C 5/16* (2013.01); *Y10T 29/31* (2015.01)

(58) Field of Classification Search
CPC ...... G02C 5/16; G02C 11/10; G02C 2200/22; G02C 2200/26; G02C 2200/28; G02C 5/2254
USPC ........... 351/111, 113, 114, 117, 118, 158, 41; 356/156, 690
See application file for complete search history.

(56) References Cited

U.S. PATENT DOCUMENTS

| | | | |
|---|---|---|---|
| 3,944,344 | A | 3/1976 | Wichers |
| 5,844,656 | A | 12/1998 | Ronzani et al. |
| 5,991,085 | A | 11/1999 | Rallison et al. |
| 6,279,172 | B1 | 8/2001 | Epperson et al. |
| 6,388,640 | B1 | 5/2002 | Chigira et al. |
| 6,677,919 | B2 | 1/2004 | Saito |
| 2008/0022441 | A1 | 1/2008 | Oranchak et al. |

(Continued)

FOREIGN PATENT DOCUMENTS

EP    2096485 A1    9/2009

OTHER PUBLICATIONS

Melzer, et al., "Guidelines for HMD Design", Retrieved on: Sep. 28, 2012, Available at: http://www.usaarl.army.mil/publications/HMD_Book09/files/Section%2026%20-%20Chapter17%20 Guidelines%20for%20HMD%20design.pdf.
"International Search Report & Written Opinion for PCT Application No. PCT/US2013/074464", Mailed Date: Apr. 11, 2014, Filed Date: Dec. 11, 2013, 11 Pages.

(Continued)

*Primary Examiner* — Hung Dang
(74) *Attorney, Agent, or Firm* — Jeremy Snodgrass; Judy Yee; Micky Minhas

(57) ABSTRACT

A HMD includes a pair of temple arms having spring steel that wraps around the head to provide long axis compression. The spring steel arms produce a compressive force along the long axis of the head that counters the gravitational force of a weight positioned at the forehead. The weight is supported by the long axis compression, rather than resting on the nose, ears or the top of the head. The front to back, long axis compressive force frees the head from all but the smallest amount of paraphernalia and allows for the weight to be worn in a way that is comfortable and non-intrusive. The spring steel temple arms are over bent inward well beyond the smallest size head and is used with a spine material that limits how far the temple arms can bend inward. An interface layer is also attached to provide comfort to the head.

20 Claims, 9 Drawing Sheets

(56) References Cited

U.S. PATENT DOCUMENTS

| | | |
|---|---|---|
| 2011/0080556 A1 | 4/2011 | Yee et al. |
| 2011/0120588 A1 | 5/2011 | Shteiyer |
| 2011/0227820 A1* | 9/2011 | Haddick et al. ............... 345/156 |
| 2012/0210489 A1 | 8/2012 | Abreu |

OTHER PUBLICATIONS

Written Opinon of the International Examining Authority dated Oct. 6, 2014 in PCT Application No. PCT/US2013/074464.

Response to Written Opinion filed Dec. 8, 2014 in PCT Application No. PCT/US2013/074464.

* cited by examiner

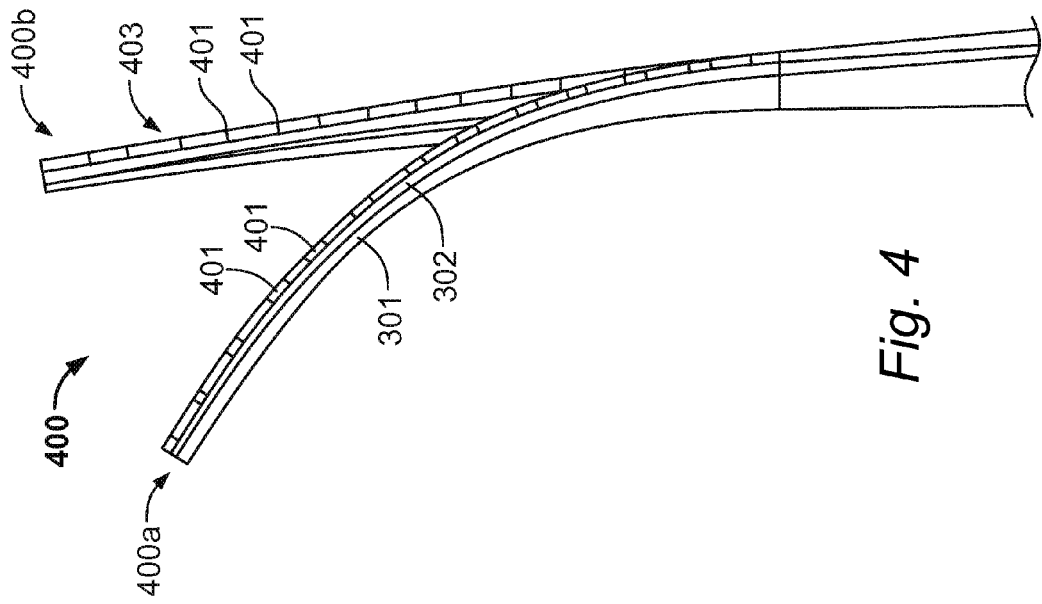
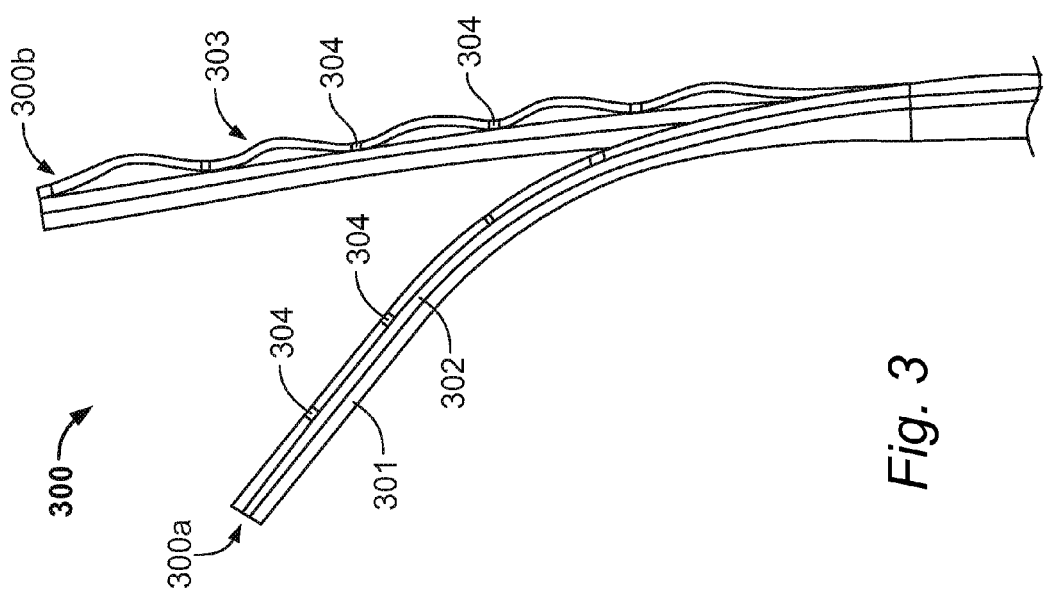
Fig. 4
Fig. 3

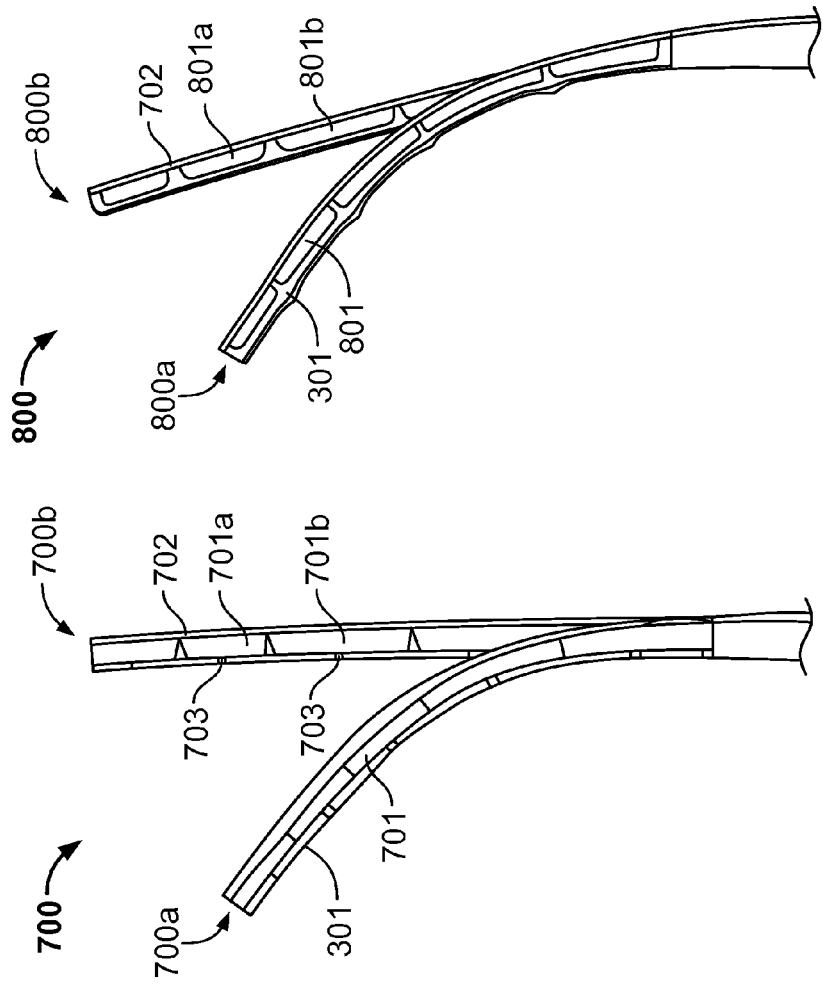

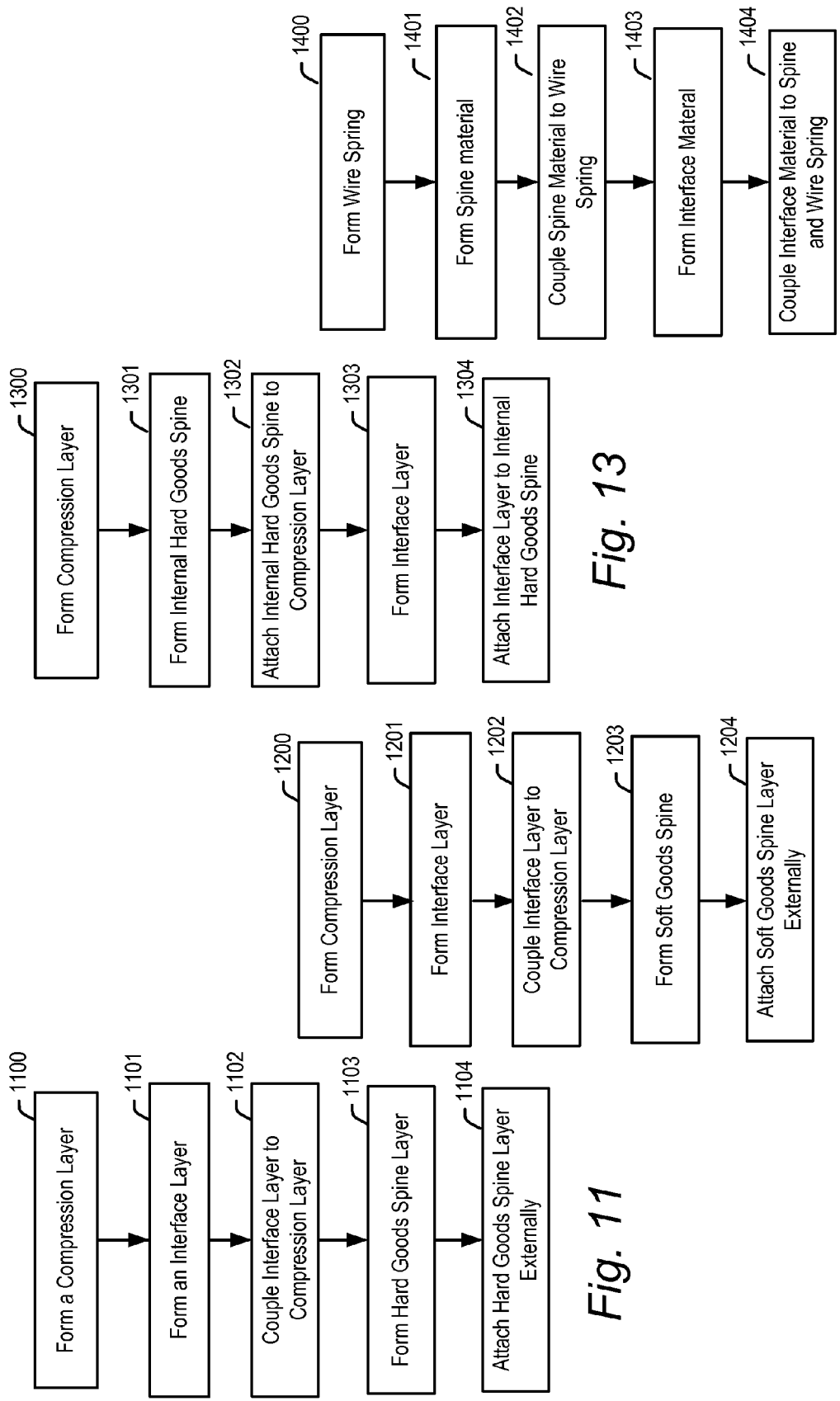

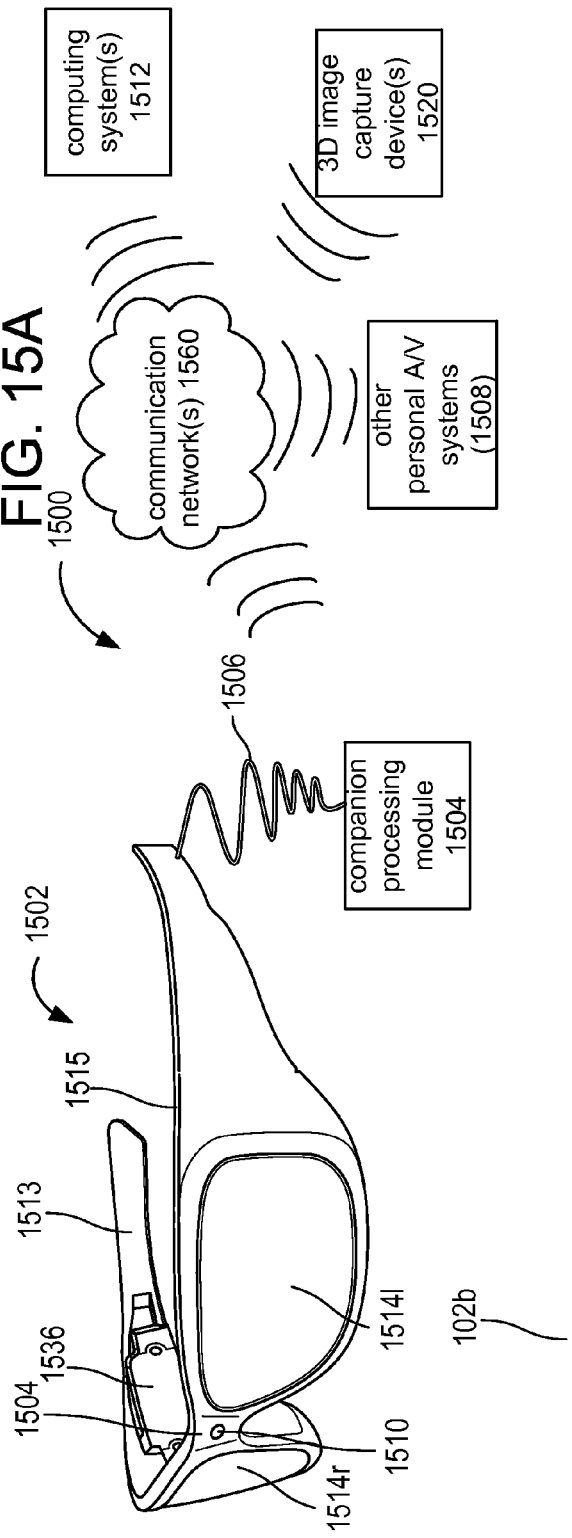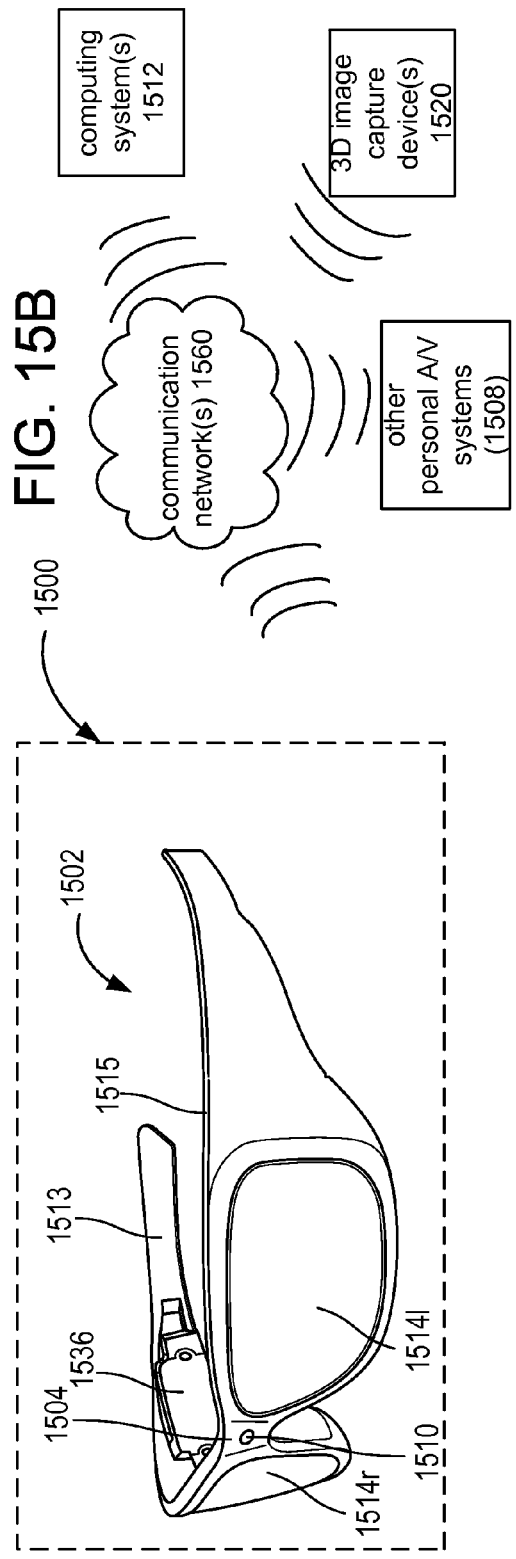

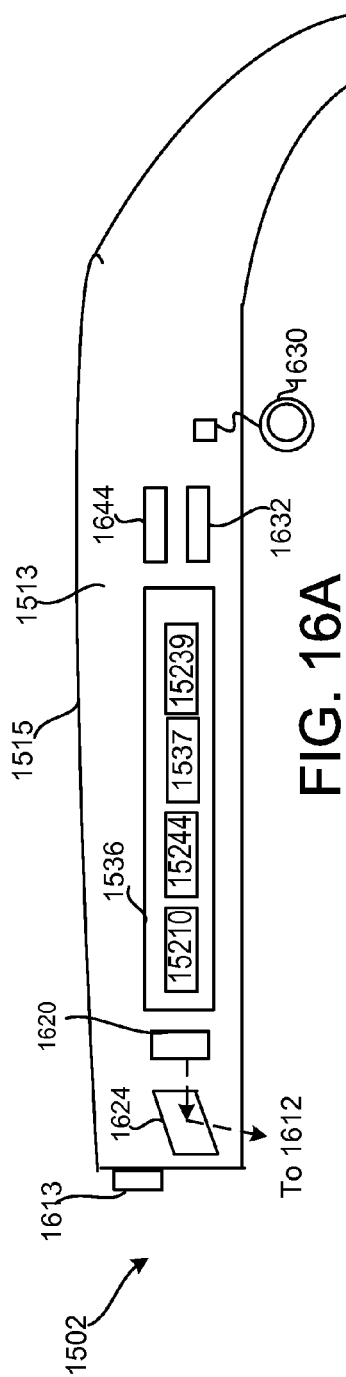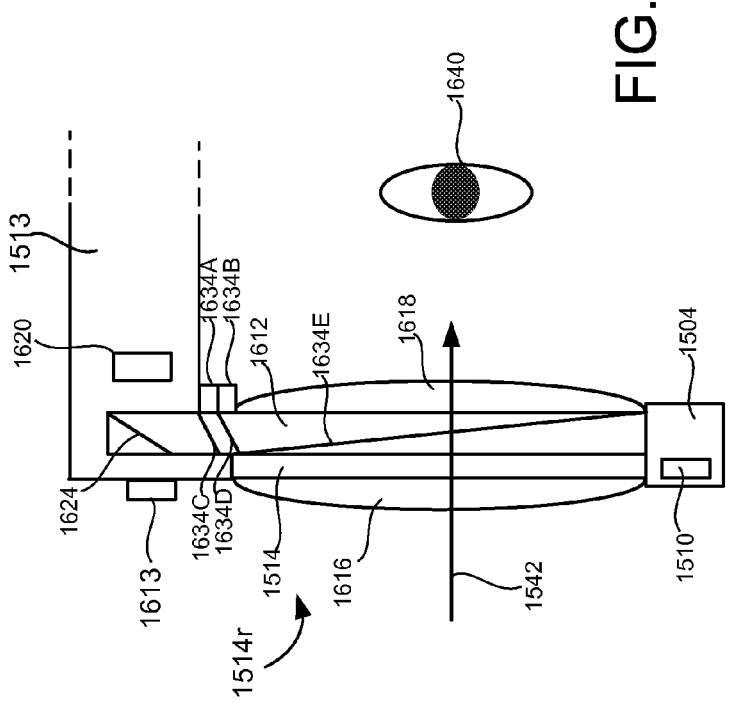
FIG. 16A
FIG. 16B

HEAD WORN DEVICE HAVING TEMPLE ARMS TO PROVIDE LONG AXIS COMPRESSION

BACKGROUND

A near-eye display device, such as a head mounted display (HMD), may be worn by a user for an augmented reality (AR) experience or a virtual reality (VR) experience. A typical HMD may have a small optic or display in front of one (monocular HMD) or each eye (binocular HMD). In a VR experience, a display may provide a computer-generated image (CGI) to a user wearing a HMD. In a AR experience, a display may use an optical see-through lens to allow a CGI to be superimposed on a real-world view. A display in a HMD may include a helmet, visor, glasses, goggles or attached by one or more straps. HMDs are used in at least aviation, engineering, science, medicine, gaming, video, sports, training and simulations.

SUMMARY

A HMD includes a pair of temple arms having spring steel (or other compression material) that wraps around a head to provide primarily long axis compression that comfortably secures a weight of at least a display optical system or other device. The spring steel arms produce primarily a compressive force along the long axis of the head (front to back) that counters the gravitational (downward) force of a weight positioned at the forehead. The pair of temple arms also exert a clamping or compression force that is not directed toward the long axis of the head as the pair of temple arms wraps around the head. The weight is supported primarily by the long axis compression, rather than primarily resting on the nose, ears or the top of the head. The front to back, long axis compressive force frees the head from all but the smallest amount of paraphernalia and allows for the weight to be worn in a way that is comfortable and non-intrusive. By distributing the load over a larger area, the total load can be higher for a more secure fit, but local pressure can be reduced for comfort A spring steel temple arm, or other compression material, is over bent inward well beyond the smallest size head and is used with a spine material that limits how far the compression material can bend inward. In an embodiment, spine material is in tension and preloads the compression material into position such that an opening of the temple arms is just slightly smaller than the smallest head in an embodiment. A user may easily put on the temple arms because a small deflection relaxes the spine material and reengages the full strength of the spring material. In an embodiment, a user exerts a force, such as 3N, before a deflection occurs, as opposed to a spring material that will start to deflect at a smaller force. Consequently, the temple arms provide a more consistent force on small and large head sizes. Different types of compression and spine materials, such as hard and soft goods, may be positioned in a variety of orientations in manufacturing the pair of temple arms. An interface material may also be attached to provide comfort to a user's head.

The spring steel arms extend from the temples of a user to the rear of the head (toward the inion). The spring steel arms are pre-loaded and flexed into position to fit around the head. The pre-loading of the spring steel may be variable in three zones along the arms: with increasing flex pre-loaded along the length, from a forward, straight portion, a middle flexible portion and a rear, most-flexible portion. The three sections may be continuous or articulated. In alternate embodiment, more or less than three zones or sections may be used. In an embodiment, spring steel is tapered or more narrow as the spring steel extends toward the inion. In an embodiment, the sections form progressive cantilevers. Each section transfers its load as well as any attached sections. For example in a three section embodiment, the spring load for a forward section is strong enough to resist a load being applied to all three sections. The spring load for a middle section is strong enough to resist a load applied to the middle and rear section. The spring load for the rear section is strong enough for the load applied to the rear section.

The pair of temple arms distribute load around the user's head while retaining the look and feel of typical sports eyewear temple arms. The pair of temple arms wrap most of the way around the user's head, but without the need for full loop connection around the head like a typical surgical loop or full head strap. A wide range of head sizes may be accommodated (one size fits most) without needing user adjustments such as sliding mechanisms and/or multiple set points. A small range of clamping force, for example 2-5N, is maintained across the wide range of head sizes. An eyewear temple form factor may allow the temple arms to articulate around hinge points to collapse the HMD for storage like typical eyewear.

The present technology relates to an apparatus to position a near-eye display (or other device) on a head of a user. The apparatus includes temple arms that are coupled to the near-eye display. Each temple arms include compression material to exert a compression force primarily toward a long axis of the head and spine material to limit a displacement of the compression material. An interface material is positioned on an inner side of each of the temple arms.

The present technology also relates to an apparatus that comprises a computing device that provides an electronic signal representing visual information and a head mounted display that provides a visual image in response to the electronic signal. The head mounted display includes temple arms coupled to a near-eye display. Each temple arm includes spring steel to exert primarily a compression force inward and a spine material coupled to the spring steel to limit the displacement of the spring steel. An interface material positioned internal to at least a portion of both the spring steel and the spine material.

The present technology also relates to a method of manufacturing a pair of temple arms to be coupled to a display that is to be worn on a head. The method includes forming a compression material, in each temple arm of the pair of temple arms, that provides a compression force primarily toward a long axis of the head. A spine material, in each temple arm of the pair of temple arms, is formed that limits a displacement of the compression layer toward the long axis. An interface material, in each temple arm of the pair of temple arms, is formed that provides an interface between each temple arm and the head.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a top cross section view of a temple arm having an external soft good spine that is stretchable fabric in a preloaded and loaded position.

FIG. 4 is a top cross section view of a temple arm having an external soft good spine that is perforated fabric or foam in a preloaded and loaded position.

FIG. 5 is a side view of a temple arm in FIG. 4 in a preloaded position.

FIG. 6 is a side view of a temple arm in FIG. 4 in a loaded position.

FIG. 7 is a top cross section view of a temple arm having an internal hard goods spine with stretchy material in a preloaded and loaded position.

FIG. 8 is a top cross section view of a temple arm having an internal hard goods spine with foam or silicon in a preloaded and loaded position.

FIG. 11 is a flow chart illustrating a method to manufacture a pair of temple arms having an external hard good spine.

FIG. 12 is a flow chart illustrating a method to manufacture a pair of temple arms having an external soft good spine.

FIG. 13 is a flow chart illustrating a method to manufacture a pair of temple arms having an internal hard goods spine.

FIG. 14 is a flow chart illustrating a method to manufacture a pair of temple arms having wire-foam spring.

FIG. 15A is a block diagram depicting example components of an embodiment of a personal audiovisual (AV) apparatus having a near-eye AR display and companion processing module.

FIG. 15B is a block diagram depicting example components of another embodiment of a AV apparatus having a near-eye AR display.

FIG. 16A is a side view of a HMD having a temple arm with a near-eye, optical see-through AR display and other electronics components.

FIG. 16B is a top partial view of a HMD having a temple arm with a near-eye, optical see-through, AR display and other electronic components.

DETAILED DESCRIPTION

A variety of different types of materials positioned in a variety of orientations may be used in manufacturing a pair of temple arms that primarily provide comfortable long axis compression in a HMD. In alternate embodiments, the pair of temple arms maybe used to mount other head mounted devices, such as surgical loupes, high-power headlamps and other types of head mounted devices. In an embodiment, a spine material including hard goods may be formed externally to the compression layer, such as spring steel, with an inner interface layer to provide comfort to a user's head. Alternatively, an external spine material may include soft goods, such as stretchable fabric or dense foam. Also, an internal spine material may be formed between an external compression material and internal interface material. The internal spine material may be a compression-style hard stop mechanism including multiple links that have small wedge-shaped gaps. A wire-form spring may also be used as the compression material with a spine material positioned in between two parallel wires in an embodiment.

Figure 1:
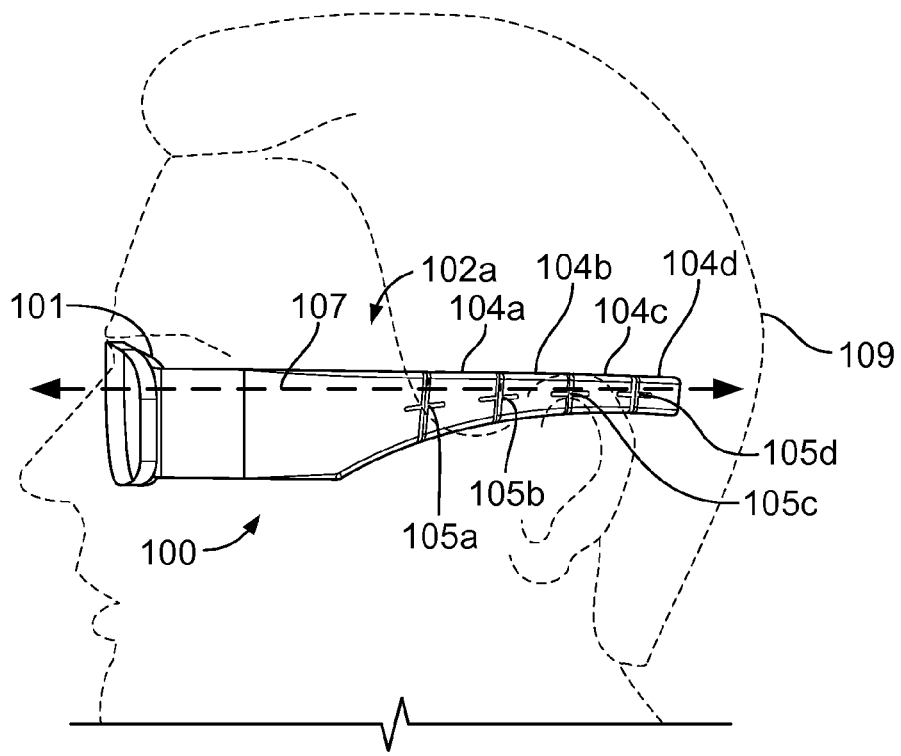
FIG. 1 is a side view of a temple arm having an external hard good spine used in a HMD.
Figure 2:
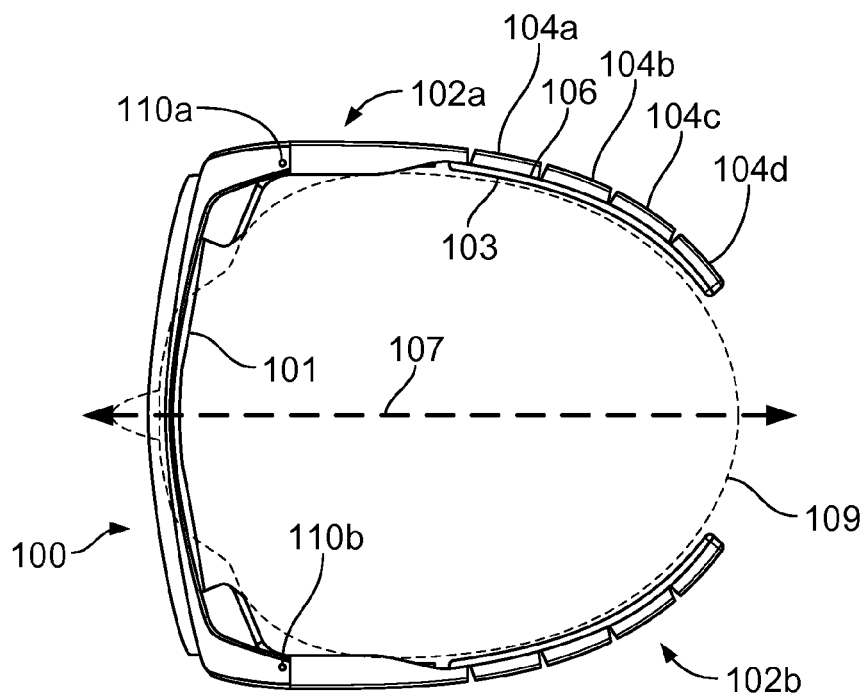
FIG. 2 is a top view of a pair of temple arms having external hard good spines used in a HMD.

FIGS. 1 and 2 are a side and top view of a HMD 100 having a pair of temple arms 102a-b having external hard good spines. The pair of temple arms 102a-b also includes a compression material, such as spring steel 106, that wraps around head 109 to provide primarily a long axis compression that comfortably secures a weight at a forehead of a user. In particular, spring steel 106 produces primarily a compressive force toward the long axis 107 of a user's head 109 (front to back) that counters a gravitational (downward) force of the weight at the forehead. Temple arms 102a-b also exert a clamping or compression force that is not directed toward the long axis of the head as the pair of temple arms 102a-b wraps around the head 109. Weight at the forehead is supported primarily by the long axis compression, rather than resting on the nose, ears or the top of the head. The weight at the forehead may include at least the weight of a display optical system as well as other electronic components. In embodiments, the display optical system may be used in an AR or VR experience as described herein.

Spring steel 106 extends from the temples to the rear of user's head 109 toward the inion. Spring steel 106 is preloaded and flexed into position to fit around user's head 109. In alternate embodiments, spring steel 106 may be replaced entirely or partly with other types of compression material, such as fiberglass, carbon-fiber or other type of compression material. In an embodiment, pre-loading of spring steel 106 is variable in three zones along temple arms 102a-b: with increasing flex pre-loaded along the length, from a forward, straight portion, a middle flexible portion and a rear, most-flexible portion. The three sections may be continuous or articulated in embodiments. In alternate embodiments, more or less sections may be used. While embodiments do not need a full-loop strap around user's head 109, a full-loop strap may be used in other embodiments.

An external hard goods spine material contains hard stops that prevent temple arms 102a-b from completely collapsing in on themselves. Spring steel 106 may be over bent inward well beyond the smallest size head, and used with an external hard goods spine material, such as links 104a-d and rods 105a-d, that limits how far spring steel 106 may be bent inward. An interface material 103 is formed internally to spring steel 106 to provide comfort to a user's head 109.

The over bending of the spring steel 106 creates a range of clamping force, for example 2-5N, across a wide range of head sizes. Spring steel 106 can be over bent to a constant curvature, or to varying degrees at various dimensions along its length. Varying degrees of curvature at various lengths enables a pressure profile to be fine-tuned to optimally distribute a load around a user's head 109.

In an embodiment, temple arms 102a-b are coupled to display optical system 101 by articulating hinges 110a-b so that the HMD 100 may have temple arms that may be folded inward as in typical glasses or spectacles. In an embodiment, articulating hinges 100a-b are spring loaded hinges having a hard stop. In an embodiment, articulating hinges 100a-b will not rotate outwards until a force exceeds a predetermined spring force in articulating hinges 110a-b and the spring force of the articulating hinges 110a-b increases slightly as the temple arms 102a-b are rotated outward. In an alternate embodiment, temple arms 102a-b are coupled to display optical system 101 without articulating hinges 110a-b and thus temple arms 102a-b cannot be folded inward.

FIG. 11 is a flow chart illustrating a method to manufacture one or more temple arms having an external hard good spine. FIG. 11, as well as other flow charts herein, illustrate steps for manufacturing one or more temple arms used in a HMD. In alternate embodiments, more or less manufacturing or fabrication steps may be used. In embodiments, a step may represent manufacturing by a machine or process with or without human operator intervention. In embodiments, a step may represent manufacturing at least partially performed by one or more individuals. For example, embodiments may include further steps of coupling the temple arms to a display optical system and/or other HMD electronics.

Step 1100 illustrates forming a compression middle layer. In an embodiment, the middle layer is a rolled spring steel layer that clamps a HMD on user's head. A compression middle layer is stamped from roll or sheet steel to match ID intent profile for a temple arm in an embodiment. Assembly and mounting components, such as holes, may be stamped in stock steel shape.

Step 1101 illustrates forming an inner-most interface layer that may provide comfort to a user's head. In an embodiment, the interface layer is die cut or compression-molded foam, cast silicone, and/or some other foam or padded material. Inner-most interface layer prevents a user's hair from being pinched in between possible links in spine material in an embodiment. In an embodiment, an interface layer may be a single layer or may include multiple layers, and could be wrapped with a fabric surface for cosmetics and feel. Step 1102 illustrates coupling the interface layer to the compression layer. In an embodiment, adhesive is used to couple the interface layer to the compression layer. In alternate embodiments, other methods of coupling the layers may be used as described herein.

Step 1103 illustrates forming the outer-most layer as a hard goods spine layer. For example, links 104a-d and rods 105a-d are formed as illustrated in FIGS. 1 and 2. In this embodiment, since the spine layer is mounted outside the compression layer, the spine layer is a tension-style hard stop mechanism. In an embodiment, the spine layer includes multiple primary links that are made from molded plastic, cast or formed metal, or other equivalent process. In embodiments, the primary links may include a variety of geometric shapes, or combination thereof. In an embodiment, the primary links are connected to each other via tension links that may or may not form articulating hinges. These links could be individual rod shafts, formed sheet metal links, or molded polymer or composite links between each of the primary links. In an alternate embodiment, the connection between the primary links could be made via a single cable that runs the entire length (or a portion) of the temple arms and weaves through each of the primary links. In an embodiment, a cable would have a specific length and be attached to the front and rear of a temple arm to provide the overall stops. When the temple arms are in its relaxed state/preload state (i.e. not on a user's head 109), the stops are pulled to their fullest extent since the temple arms are collapsed to their most curled position. When the temple arms are on a user's head, the tension links are relieved and they float relative to the primary links.

Step 1104 illustrates coupling the hard goods spine layer to the compression layer. In an embodiment, the hard goods spine is coupled to the compression layer by adhesive or other equivalent methods described herein.

FIG. 3 is a top cross section view of a temple arm 300 having an external soft goods spine material 303 that may have a stretchable fabric in a preloaded position 300a and loaded position 300b. In an embodiment, temple arm 300 is similar to temple arms 102a-b described above with interface material 301 and compression material 302. However, FIG. 3 illustrates an external spine material 303 that includes a soft goods rather than a hard goods as illustrated in FIGS. 1-2.

In an embodiment, external spine material 303 is a fabric that has stretchable fibers interwoven with non-stretchable fibers. When the compression material 302 is in preload position 300a the outer spine fabric is stretched taut. The non-stretchable fibers are drawn to their maximum length which prevents the temple arms from collapsing all the way.

In an alternate embodiment, external spine material 303 is a fabric or dense foam, such as neoprene that may be partially stretchable and simply maxes out at a certain or predetermined percentage of stretch. This material may be the less reliable since it is difficult to control uniform stretching across different lots of soft goods. Furthermore, it may be difficult to make hard stops out of what is generally soft stops.

To maintain mechanical advantage of spine material 303 over the compression material 302, spine material 303 is connected to compression material 302 at attachment points 304 that have a minimal spacing in an embodiment. Minimum spacing may be achieved via hard plastic ribs that are attached (via adhesives, heat-stakes, ultrasonic welding, or insert-molding) to the outer surface of the spine material 303 at repeated minimal spacing. In an alternate embodiment, spacing could also be created by localized formed features that are stamped into a compression material 302 and used to attach spine material 303. In an alternate embodiment, a secondary layer of thin sheet plastic could be adhered to the outside of the compression material 302 or underside of the spine material 303 to enable the minimum spacing.

FIGS. 4-6 illustrate a temple arm 400 in a preloaded position 400a having a perforation pattern openings 401 and loaded position 400b when the perforation pattern openings 401 are closed. Temple arm 400 is similar to temple arm 300 in having interface material 301 and compression material 302. However unlike temple arm 300, temple arm 400 includes a perforation pattern in an external soft goods spine material 403. In an embodiment, external soft goods spine material 403 is a fabric or dense foam, such as neoprene, that may be partially stretchable but is enabled to stretch by a perforation pattern that is die or laser cut. In an alternate embodiment, other processes for creating a perforation pattern in a soft good may be used. A perforation pattern allows the external soft goods spine material 403 to stretch a fixed distance before reaching a maximum length. In an embodiment, temple arm 400 has minimal thickness as compared to other embodiments. In an embodiment, a plurality of different types/shapes of perforation patterns on an external soft spine material may be used. The various types/shapes of perforation patterns may be selected so that they are also cosmetically appealing to a large range of potential consumers, or alternatively, to a targeted consumer.

FIG. 12 is a flow chart illustrating a method to manufacture a pair of temple arms having an external soft good spine material. Steps 1200-1202 illustrate forming a compression layer, interface layer and attaching the two layers as similar described above in FIG. 11.

Steps 1203 and 1204 illustrate forming the outer-most layer as an external soft goods spine layer and attaching the soft goods spine layer to the compression layer. In an embodiment, an outer-most external soft goods spine layer is made of stretchable fabric or dense foam as described herein. In an embodiment, forming an outer-most external soft goods spine layer includes forming a perforation pattern as described herein. In various embodiments, a soft goods spine layer may be attached to the underlying compression layer via numerous methods such as glue, pressure-sensitive adhesive (PSA), sintering/hot-melt, rivets, or other mechanical methods. The spacing of these attachment points 304 of spine material 303, as illustrated in FIG. 3, can be varied along a temple arm in order to provide a predetermined amount of inner bending (or displacement) of the compression material at particular sections of a temple arm.

FIG. 7 is a top cross section view of a temple arm 700 having an internal hard goods spine material in a preloaded position 700a and loaded position 700b. In an embodiment, a middle hard goods spine material 701 includes a compression-style stop mechanism since it is mounted inside compression material 702. In an embodiment, spine material 701 is comprised of multiple links 701a-b that have small wedge-shaped gaps between them. In alternate embodiments, gaps are rectangular and the top corners would contact each other during flexure instead of the whole face when using wedge-shaped gaps. Rectangular gaps may be more easily manufactured than wedge-shaped gaps because they may be cut from flat stock rather than molded/formed to shape. In the compression material's relaxed state (or preload position 700a) the links 701a-b are pressed against each other so that there is no gaps between them; this is the hard stop state. When temple arm 700 is in a loaded state 700b or on a user's head, the spine links 701a-b flex away from each other. In an embodiment, links 701a-b can be molded as one piece with hinges between each link. In embodiments, links 701a-b may include a variety of geometric shapes, or combination thereof In an embodiment, links 701a-b are coupled to interface material 301 at attachment points 703 using methods as described herein.

FIG. 8 is a top cross section view of a temple arm 800 having an internal hard goods spine with foam or silicon in a preloaded position 800a and loaded position 800b. In an embodiment, temple arm 800 is similar to temple arm 700 but links 801a-b are molded as individual pieces. In alternate embodiments, individual links 801a-b are formed by stamping, die cutting or laser cutting. Links 801a-b are then mounted in a predetermined position and spacing onto the compression material 702 using adhesives, heat-stakes, ultrasonic welding, insert-molding or other attachment process.

In an alternate embodiment, fabricating a middle hard goods spine material 801 is combined with fabricating the inner-most interface material 301 by insert or double-shot molding links 801a-b within interface material 301.

In alternate embodiments, a cosmetic layer could be affixed to an outside surface of outer compression material 702. This cosmetic layer could also stretch around to cover the inside surface of internal hard goods spine material 701 and 801.

In an alternate embodiment, a tubular fabric or rubber component slides over a subassembly of internal hard goods spine material 701/801 and compression material 702. This component would create internal comfort features and external cosmetics all with a single component.

In still another embodiment, internal hard goods spine material 801 and compression material 702 are multi-shot molded for internal comfort and external cosmetics, via insert-molding, double-shot molding, insert compression molding, or some other equivalent fabrication process.

FIG. 13 is a flow chart illustrating a method to manufacture a pair of temple arms having an internal hard goods spine. Step 1300 illustrates forming a compression layer, such as spring steel as described herein.

In Step 1301, an internal hard goods spine is fabricated as described herein. For example, a compression-style stop mechanism having multiple links are fabricated as described herein. In an alternate embodiment, the links are manufactured into individual pieces. In still a further embodiment, an internal hard goods spine is fabricated with an inner-most interface material using multi-shot molding.

Step 1302 illustrates attaching an internal hard goods spine to compression material. In embodiments, the internal hard goods spine is attached to the compression material using adhesives, heat-stakes, ultrasonic welding, insert-molding or an equivalent process. In Steps 1303 and 1304, an interface layer is fabricated and attached to the internal hard goods spine as described herein.

Figure 9A:
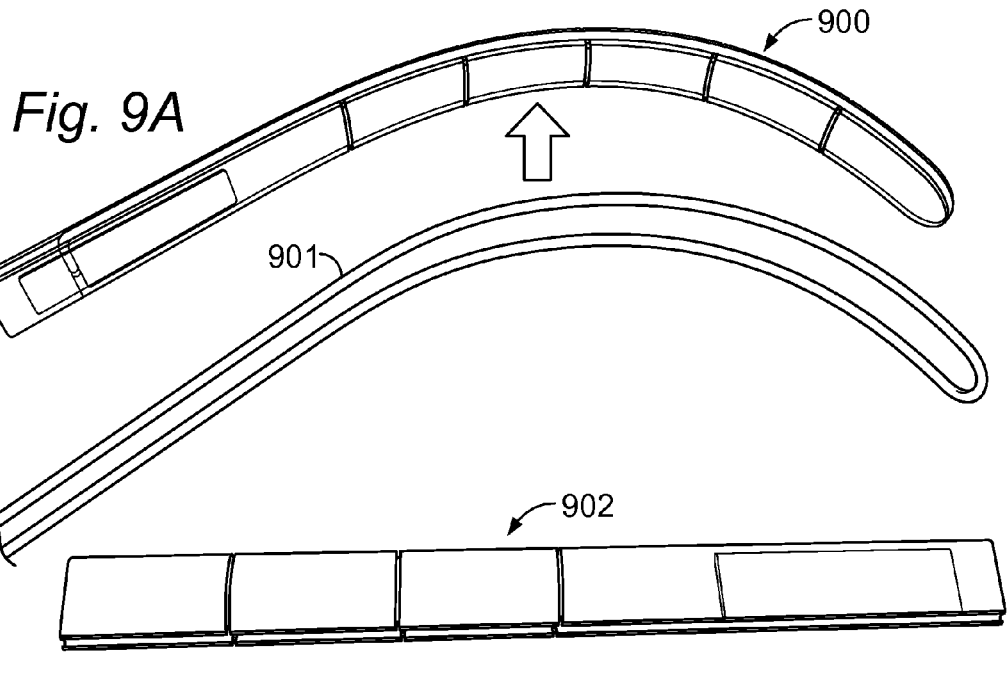
FIGS. 9A-B are a top inner view of a temple arm having a wire-form spring and material used to form the temple arm having a wire-form spring and cross section views of a temple arms having a wired form spring.
Figure 9B:
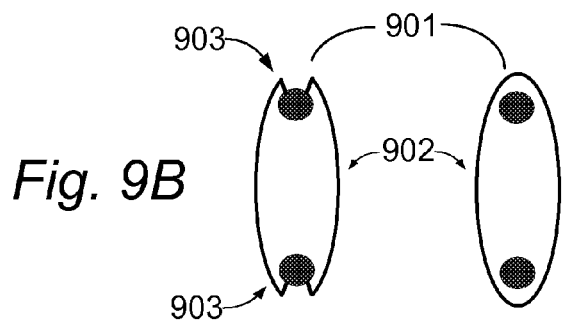
Figure 10:
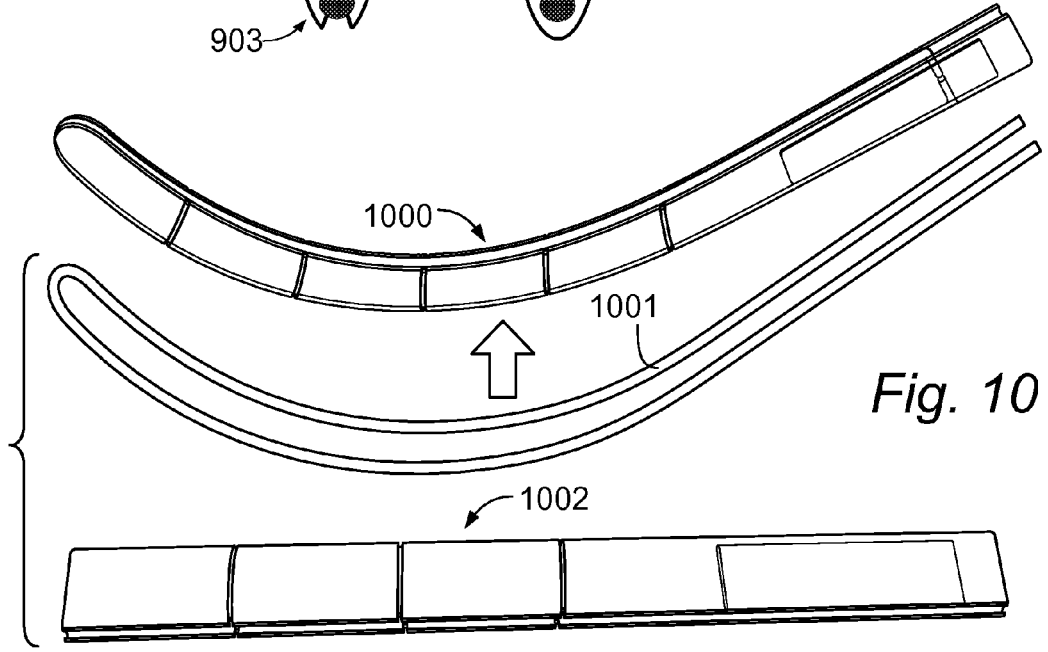
FIG. 10 is a top outer view of a temple arm having a wire-form spring and materials used to form the temple arm having a wire-form spring.

FIGS. 9A-B and 10 illustrate temple arms having wire-form springs as the compression material rather than spring steel. In particular, FIG. 9A illustrates an inner view of a temple arm 900 having a wire-form spring 901 and a spine material 902. FIG. 9B illustrates cross sections of temple arms having wire-form springs in at least two embodiments. In an embodiment, a wire-form spring 901 is snapped into spine material 902 having a C-shape 903. Alternatively, a wire form spring 901 is fully encapsulated by spine material 902. FIG. 10 illustrates an outer view of temple arm 1000 having a wire-form spring 1001 and spine material 1002. In an embodiment, wire-form springs 901 and 1000 are formed by bending or looping a wire (looped wire). In an embodiment, spine material 902 and 1002 is shaped to fit in between two parallel portions of wires 901 and 1001. In an embodiment, temple arms 900 and 1000 are thinner than embodiments in which spine material is layered with or stacked against compression material. Temple arms 900 and 1000 enable a stronger spring in a smaller form factor and weight, as the spring's moment of inertia can be built up more readily with the circular cross section than with a flat spring, which may be much heavier for the same performance.

FIG. 14 is a flow chart illustrating a method to manufacture a pair of temple arms having a wire-form spring. Step 1400 illustrates forming a wire spring to fit in a temple arm from a wire. In an embodiment, a wire spring forms a profile of a temple arm used in a HMD. In an embodiment, a wire spring is formed having a loop with a parallel portion.

Step 1401 illustrates fabricating a spine material used with a wire-formed spring. In an embodiment, spine material may be molded as a single part with linking hinges or formed as a set of individual parts or links held together with fabric. In alternate embodiments, a set of individual parts or links may be held together by tape. In an alternate embodiments, hinge details may be molded into individual links or alternatively hinges between links may be formed from the fabric coupling respective links.

Step 1402 illustrates coupling the spine material to a wire-formed spring. In an embodiment, spine material is fabricated in step 1401 having circular channels (whether fully enclosed or open like a "C" as illustrated in FIG. 9B) molded into edges so as to enable a wire-formed spring to snap (or slide) into position in step 1402.

Step 1403 illustrates forming an interface layer as similarly described herein. Step 1404 illustrates coupling the interface layer to the spine material and wire-foam spring. In an embodiment, an interface layer is coupled to spine material as similar described herein. In embodiments, an outer cosmetic layer could be further attached, such as a tubular cover as described herein.

FIG. 15A is a block diagram depicting example components of an embodiment of a personal audiovisual (A/V) apparatus having temple arms as described herein. Personal A/V apparatus 1500 includes an optical see-through, AR display device as a near-eye, AR display device or HMD 1502 in communication with a companion processing module 1504 via a wire 1506 in this example or wirelessly in other examples. In this embodiment, HMD 1502 is in the shape of eyeglasses having a frame 1515 with temple arms as described herein, with a display optical system 1514, 1514*r* and 1514*l*, for each eye in which image data is projected into a user's eye to generate a display of the image data while a user also sees through the display optical systems 1514 for an actual direct view of the real world.

Each display optical system 1514 is also referred to as a see-through display, and the two display optical systems 1514 together may also be referred to as a see-through, meaning optical see-through, AR display 1514.

Frame 1515 provides a support structure for holding elements of the apparatus in place as well as a conduit for electrical connections. In this embodiment, frame 1515 provides a convenient eyeglass frame as support for the elements of the apparatus discussed further below. The frame 1515 includes a nose bridge 1504 with a microphone 1510 for recording sounds and transmitting audio data to control circuitry 1536. A temple arm 1513 of the frame provides a compression force towards the long axis of a user's head, and in this example the temple arm 1513 is illustrated as including control circuitry 1536 for the HMD 1502.

As illustrated in FIGS. 16A and 16B, an image generation unit 1620 is included on each temple arm 1513 in this embodiment as well. Also illustrated in FIGS. 16A and 16B are outward facing capture devices 1613, e.g. cameras, for recording digital image data such as still images, videos or both, and transmitting the visual recordings to the control circuitry 1536 which may in turn send the captured image data to the companion processing module 1504 which may also send the data to one or more computer systems 1512 or to another personal A/V apparatus over one or more communication networks 1560.

Figure 18:
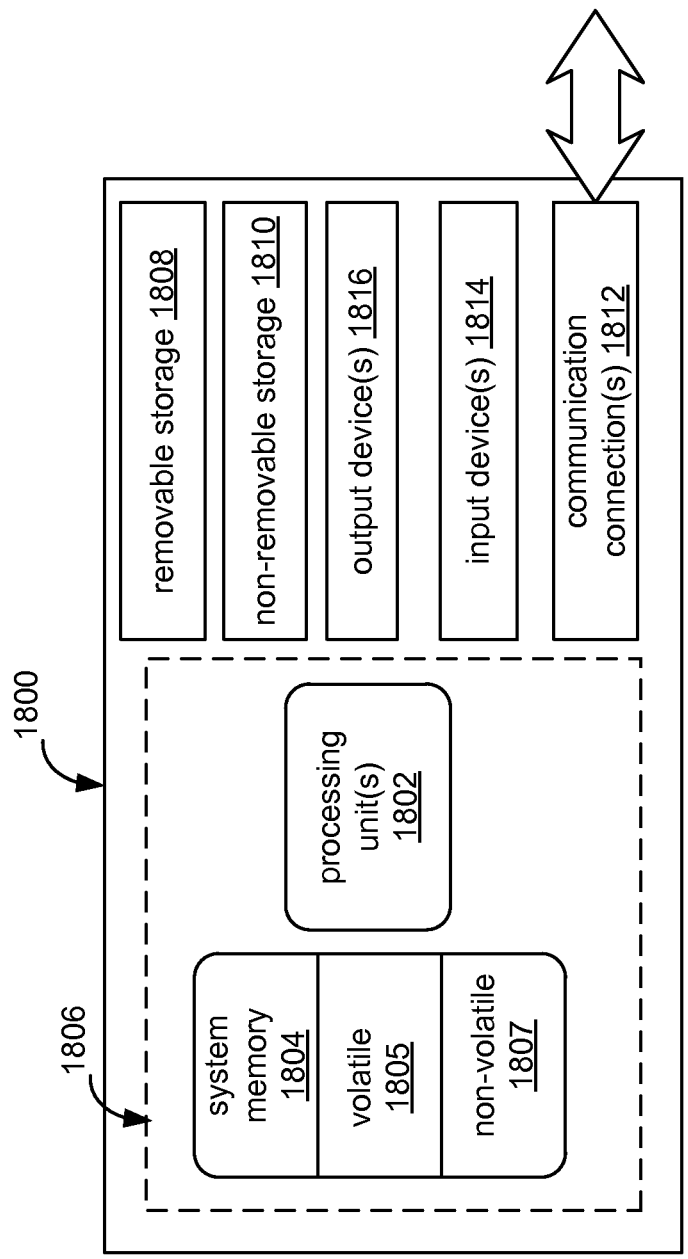
FIG. 18 illustrates is a block diagram of one embodiment of a computing system that can be used to implement a network accessible computing system or a companion processing module.

The companion processing module 1504 may take various embodiments. In some embodiments, companion processing module 1504 is a separate unit which may be worn on the user's body, e.g. a wrist, or be a separate device like a mobile device (e.g. smartphone). The companion processing module 1504 may communicate wired or wirelessly (e.g., WiFi, Bluetooth, infrared, an infrared personal area network, RFID transmission, wireless Universal Serial Bus (WUSB), cellular, 3G, 4G or other wireless communication means) over one or more communication networks 1560 to one or more computer systems 1512 whether located nearby or at a remote location, other personal A/V apparatus 1508 in a location or environment. In other embodiments, the functionality of the companion processing module 1504 may be integrated in software and hardware components of the HMD 1502 as in FIG. 15B. Some examples of hardware components of the companion processing module 1504 are shown in FIG. 18. An example of hardware components of a computer system 1512 is also shown in FIG. 18. The scale and number of components may vary considerably for different embodiments of the computer system 1512 and the companion processing module 1504.

An application may be executing on a computer system 1512 which interacts with or performs processing for an application executing on one or more processors in the personal A/V apparatus 1500. For example, a 3D mapping application may be executing on the one or more computers systems 12 and the user's personal A/V apparatus 1500.

In the illustrated embodiments of FIGS. 15A and 15B, the one or more computer system 1512 and the personal A/V apparatus 1500 also have network access to one or more 3D image capture devices 1520 which may be, for example one or more cameras that visually monitor one or more users and the surrounding space such that gestures and movements performed by the one or more users, as well as the structure of the surrounding space including surfaces and objects, may be captured, analyzed, and tracked. Image data, and depth data if captured, of the one or more 3D capture devices 1520 may supplement data captured by one or more capture devices 1613 on the near-eye, AR HMD 1502 of the personal A/V apparatus 1500 and other personal A/V apparatus 1508 in a location for 3D mapping, gesture recognition, object recognition, resource tracking, and other functions as discussed further below.

FIG. 15B is a block diagram depicting example components of another embodiment of a personal audiovisual (A/V) apparatus having a near-eye AR display which may communicate over a communication network 1560 with other devices. In this embodiment, the control circuitry 1536 of the HMD 1502 incorporates the functionality which a companion processing module 1504 provides in FIG. 15A and communicates wirelessly via a wireless transceiver (see wireless interface 1537 in FIG. 16A) over a communication network 1560 to one or more computer systems 1512 whether located nearby or at a remote location, other personal A/V apparatus 1500 in a location or environment and, if available, a 3D image capture device in the environment.

FIG. 16A is a side view of an eyeglass temple arm 1513 of a frame in an embodiment of the personal audiovisual (A/V) apparatus having an optical see-through, AR display embodied as eyeglasses providing support for hardware and software components. At the front of frame 1515 is depicted one of at least two physical environment facing capture devices 1613, e.g. cameras, that can capture image data like video and still images, typically in color, of the real world to map real objects in the display field of view of the see-through display, and hence, in the field of view of the user. In some examples, the capture devices 1613 may also be depth sensitive, for example, they may be depth sensitive cameras which transmit and detect infrared light from which depth data may be determined Control circuitry 1536 provide various electronics that support the other components of HMD 1502. In this example, the right temple arm 1513 includes control circuitry 1536 for HMD 1502 which includes a processing unit 15210, a memory 15244 accessible to the processing unit 15210 for storing processor readable instructions and data, a wireless interface 1537 communicatively coupled to the processing unit 15210, and a power supply 15239 providing power for the components of the control circuitry 1536 and the other components of HMD 1502 like the cameras 1613, the microphone 1510 and the sensor units discussed below. The processing unit 15210 may comprise one or more processors including a central processing unit (CPU) and a graphics processing unit (GPU).

Inside, or mounted to temple arm 1502, are an earphone or a set of earphones 1630, an inertial sensing unit 1632 including one or more inertial sensors, and a location sensing unit 1644 including one or more location or proximity sensors, some examples of which are a GPS transceiver, an infrared (IR) transceiver, or a radio frequency transceiver for processing RFID data.

In this embodiment, each of the devices processing an analog signal in its operation include control circuitry which interfaces digitally with the digital processing unit 15210 and memory 15244 and which produces or converts analog signals, or both produces and converts analog signals, for its respective device. Some examples of devices which process analog signals are the sensing units 1644, 1632, and earphones 1630 as well as the microphone 1510, capture devices 1613 and a respective IR illuminator 1634A, and a respective IR detector or camera 1634B for each eye's display optical system 154l, 154r discussed below.

Mounted to or inside temple arm 1515 is an image source or image generation unit 1620 which produces visible light representing images. The image generation unit 1620 can display a virtual object to appear at a designated depth location in the display field of view to provide a realistic, in-focus three dimensional display of a virtual object which can interact with one or more real objects.

In some embodiments, the image generation unit 1620 includes a microdisplay for projecting images of one or more virtual objects and coupling optics like a lens system for directing images from the microdisplay to a reflecting surface or element 1624. The reflecting surface or element 1624 directs the light from the image generation unit 1620 into a light guide optical element 1612, which directs the light representing the image into the user's eye.

FIG. 16B is a top view of an embodiment of one side of an optical see-through, near-eye, AR display device including a display optical system 1514. A portion of the frame 1515 of the HMD 1502 will surround a display optical system 1514 for providing support and making electrical connections. In order to show the components of the display optical system 1514, in this case 1514r for the right eye system, in HMD 1502, a portion of the frame 1515 surrounding the display optical system is not depicted.

In the illustrated embodiment, the display optical system 1514 is an integrated eye tracking and display system. The system embodiment includes an opacity filter 1514 for enhancing contrast of virtual imagery, which is behind and aligned with optional see-through lens 1616 in this example, light guide optical element 1612 for projecting image data from the image generation unit 1620 is behind and aligned with opacity filter 1514, and optional see-through lens 1618 is behind and aligned with light guide optical element 1612.

Light guide optical element 1612 transmits light from image generation unit 1620 to the eye 1640 of a user wearing HMD 1502. Light guide optical element 1612 also allows light from in front of HMD 1502 to be received through light guide optical element 1612 by eye 1640, as depicted by an arrow representing an optical axis 1542 of the display optical system 1514r, thereby allowing a user to have an actual direct view of the space in front of HMD 1502 in addition to receiving a virtual image from image generation unit 1620. Thus, the walls of light guide optical element 1612 are see-through. In this embodiment, light guide optical element 1612 is a planar waveguide. A representative reflecting element 1634E represents the one or more optical elements like mirrors, gratings, and other optical elements which direct visible light representing an image from the planar waveguide towards the user eye 1640.

Infrared illumination and reflections, also traverse the planar waveguide for an eye tracking system 1634 for tracking the position and movement of the user's eye, typically the user's pupil. Eye movements may also include blinks. The tracked eye data may be used for applications such as gaze detection, blink command detection and gathering biometric information indicating a personal state of being for the user. The eye tracking system 1634 comprises an eye tracking IR illumination source 1634A (an infrared light emitting diode (LED) or a laser (e.g. VCSEL)) and an eye tracking IR sensor 1634B (e.g. IR camera, arrangement of IR photodetectors, or an IR position sensitive detector (PSD) for tracking glint positions). In this embodiment, representative reflecting element 1634E also implements bidirectional infrared (IR) filtering which directs IR illumination towards the eye 1640, preferably centered about the optical axis 1542 and receives IR reflections from the user eye 1640. A wavelength selective filter 1634C passes through visible spectrum light from the reflecting surface or element 1624 and directs the infrared wavelength illumination from the eye tracking illumination source 1634A into the planar waveguide. Wavelength selective filter 1634D passes the visible light and the infrared illumination in an optical path direction heading towards the nose bridge 1504. Wavelength selective filter 1634D directs infrared radiation from the waveguide including infrared reflections of the user eye 1640, preferably including reflections captured about the optical axis 1542, out of the light guide optical element 1612 embodied as a waveguide to the IR sensor 1634B.

Opacity filter 1514, which is aligned with light guide optical element 112, selectively blocks natural light from passing through light guide optical element 1612 for enhancing contrast of virtual imagery. The opacity filter assists the image of a virtual object to appear more realistic and represent a full range of colors and intensities. In this embodiment, electrical control circuitry for the opacity filter, not shown, receives instructions from the control circuitry 1536 via electrical connections routed through the frame.

Again, FIGS. 15A and 15B show half of HMD 1502. For the illustrated embodiment, a full HMD 1502 may include another display optical system 1514 and components described herein.

Figure 17:
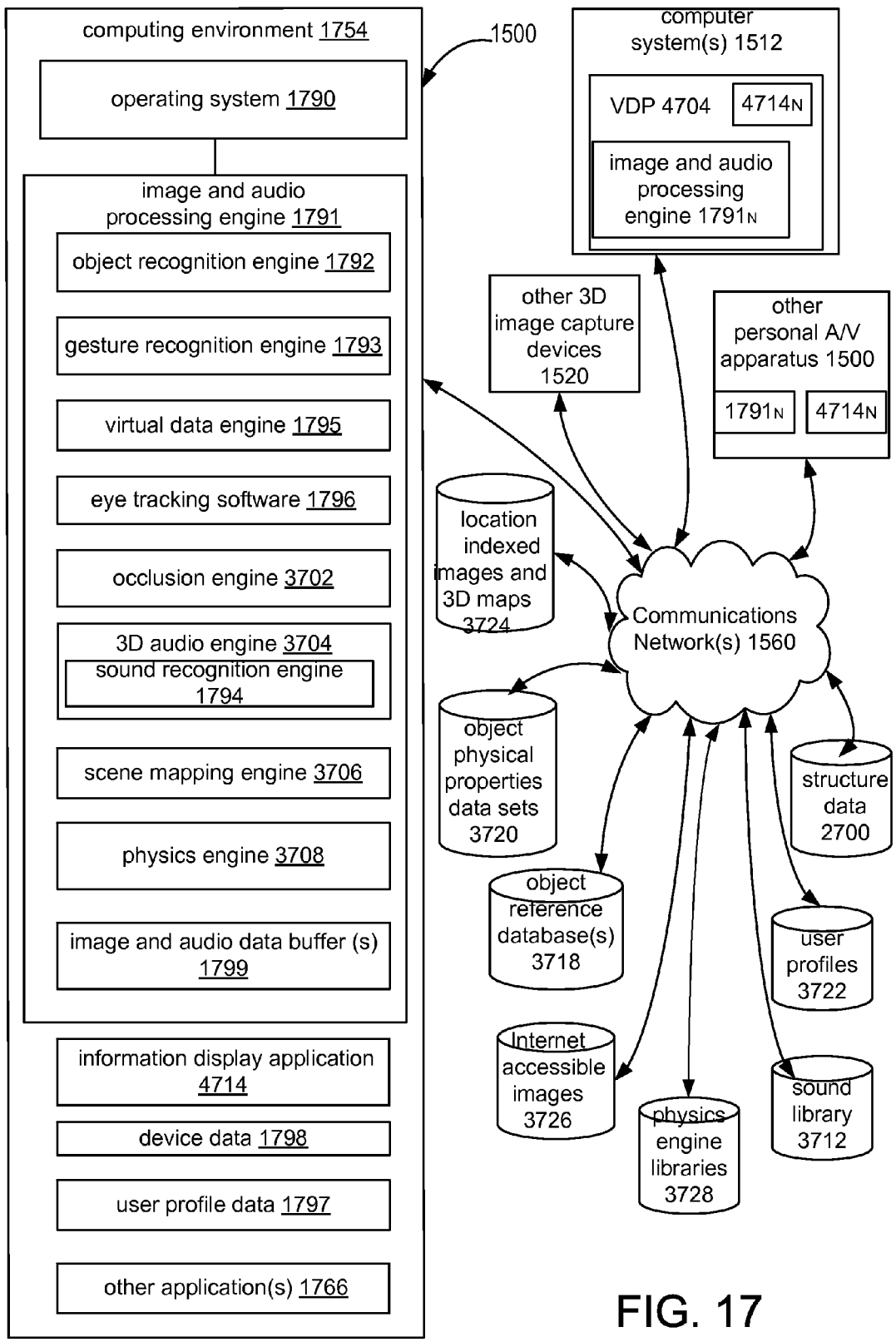
FIG. 17 illustrates is a block diagram of a system from a software perspective for representing a physical location at a previous time period with three dimensional (3D) virtual data being provided by a near-eye, optical see-through, AR display of a AV apparatus.

FIG. 17 is a block diagram of a system from a software perspective for representing a physical location at a previous time period with three dimensional (3D) virtual data being displayed by a near-eye, AR display of a personal audiovisual (A/V) apparatus. FIG. 17 illustrates a computing environment embodiment 1754 from a software perspective which may be implemented by a system like physical A/V apparatus 1500, one or more remote computer systems 1512 in communication with one or more physical A/V apparatus or a combination of these. Additionally, physical A/V apparatus can communicate with other physical A/V apparatus for sharing data and processing resources. Network connectivity allows leveraging of available computing resources. An information display application 4714 may be executing on one or more processors of the personal A/V apparatus 1500. In the illustrated embodiment, a virtual data provider system 4704 executing on a remote computer system 1512 can also be executing a version of the information display application 4714 as well as other personal A/V apparatus 1500 with which it is in communication. As shown in the embodiment of FIG. 17, the software components of a computing environment 1754 comprise an image and audio processing engine 1791 in communication with an operating system 1790. Image and audio processing engine 1791 processes image data (e.g. moving data like video or still), and audio data in order to support applications executing for a HMD system like a physical A/V apparatus 1500 including a near-eye, AR display. Image and audio processing engine 1791 includes object recognition engine 1792, gesture recognition engine 1793, virtual data engine 1795, eye tracking software 1796 if eye tracking is in use, an occlusion engine 3702, a 3D positional audio engine 3704 with a sound recognition engine 1794, a scene mapping engine 3706, and a physics engine 3708 which may communicate with each other.

The computing environment 1754 also stores data in image and audio data buffer(s) 1799. The buffers provide memory for receiving image data captured from the outward facing capture devices 1613, image data captured by other capture devices if available, image data from an eye tracking camera of an eye tracking system 1634 if used, buffers for holding image data of virtual objects to be displayed by the image generation units 1620, and buffers for both input and output audio data like sounds captured from the user via microphone 1510 and sound effects for an application from the 3D audio engine 3704 to be output to the user via audio output devices like earphones 1630.

Image and audio processing engine 1791 processes image data, depth data and audio data received from one or more capture devices which may be available in a location. Image and depth information may come from the outward facing capture devices 1613 captured as the user moves his head or body and additionally from other physical A/V apparatus 1500, other 3D image capture devices 1520 in the location and image data stores like location indexed images and maps 3724.

The individual engines and data stores depicted in FIG. 17 are described in more detail below, but first an overview of the data and functions they provide as a supporting platform is described from the perspective of an application like an information display application 4714 which provides virtual data associated with a physical location. An information display application 4714 executing in the near-eye, AR physical A/V apparatus 1500 or executing remotely on a computer system 1512 for the physical A/V apparatus 1500 leverages the various engines of the image and audio processing engine 1791 for implementing its one or more functions by sending requests identifying data for processing and receiving notification of data updates. For example, notifications from the scene mapping engine 3706 identify the positions of virtual and real objects at least in the display field of view. The information display application 4714 identifies data to the virtual data engine 1795 for generating the structure and physical properties of an object for display. The information display application 4714 may supply and identify a physics model for each virtual object generated for its application to the physics engine 3708, or the physics engine 3708 may generate a physics model based on an object physical properties data set 3720 for the object.

The operating system 1790 makes available to applications which gestures the gesture recognition engine 1793 has identified, which words or sounds the sound recognition engine 1794 has identified, the positions of objects from the scene mapping engine 3706 as described above, and eye data such as a position of a pupil or an eye movement like a blink sequence detected from the eye tracking software 1796. A sound to be played for the user in accordance with the information display application 4714 can be uploaded to a sound library 3712 and identified to the 3D audio engine 3704 with data identifying from which direction or position to make the sound seem to come from. The device data 1798 makes available to the information display application 4714 location data, head position data, data identifying an orientation with respect to the ground and other data from sensing units of the HMD 1502.

The scene mapping engine 3706 is first described. A 3D mapping of the display field of view of the AR display can be determined by the scene mapping engine 3706 based on captured image data and depth data, either derived from the captured image data or captured as well. The 3D mapping includes 3D space positions or position volumes for objects. A depth map representing captured image data and depth data from outward facing capture devices 1613 can be used as a 3D mapping of a display field of view of a near-eye AR display. A view dependent coordinate system may be used for the mapping of the display field of view approximating a user perspective. The captured data may be time tracked based on capture time for tracking motion of real objects. Virtual objects can be inserted into the depth map under control of an application like information display application 4714. Mapping what is around the user in the user's environment can be aided with sensor data. Data from an orientation sensing unit 1632, e.g. a three axis accelerometer and a three axis magnetometer, determines position changes of the user's head and correlation of those head position changes with changes in the image and depth data from the front facing capture devices 1613 can identify positions of objects relative to one another and at what subset of an environment or location a user is looking.

In some embodiments, a scene mapping engine 3706 executing on one or more network accessible computer systems 1512 updates a centrally stored 3D mapping of a location and apparatus 1500 download updates and determine changes in objects in their respective display fields of views based on the map updates. Image and depth data from multiple perspectives can be received in real time from other 3D image capture devices 1520 under control of one or more network accessible computer systems 1512 or from one or more physical A/V apparatus 1500 in the location. Overlapping subject matter in the depth images taken from multiple perspectives may be correlated based on a view independent coordinate system, and the image content combined for creating the volumetric or 3D mapping of a location (e.g. an x, y, z representation of a room, a store space, or a geofenced area). Additionally, the scene mapping engine 3706 can correlate the received image data based on capture times for the data in order to track changes of objects and lighting and shadow in the location in real time.

The registration and alignment of images allows the scene mapping engine to be able to compare and integrate real-world objects, landmarks, or other features extracted from the different images into a unified 3-D map associated with the real-world location.

When a user enters a location or an environment within a location, the scene mapping engine 3706 may first search for a pre-generated 3D map identifying 3D space positions and identification data of objects stored locally or accessible from another physical A/V apparatus 1500 or a network accessible computer system 1512. The pre-generated map may include stationary objects. The pre-generated map may also include objects moving in real time and current light and shadow conditions if the map is presently being updated by another scene mapping engine 3706 executing on another computer system 1512 or apparatus 1500. For example, a pre-generated map indicating positions, identification data and physical properties of stationary objects in a user's living room derived from image and depth data from previous HMD sessions can be retrieved from memory. Additionally, identification data including physical properties for objects which tend to enter the location can be preloaded for faster recognition. A pre-generated map may also store physics models for objects as discussed below. A pre-generated map may be stored in a network accessible data store like location indexed images and 3D maps 3724.

The location may be identified by location data which may be used as an index to search in location indexed image and pre-generated 3D maps 3724 or in Internet accessible images 3726 for a map or image related data which may be used to generate a map. For example, location data such as GPS data from a GPS transceiver of the location sensing unit 1644 on a HMD 1502 may identify the location of the user. In another example, a relative position of one or more objects in image data from the outward facing capture devices 1613 of the user's physical A/V apparatus 1500 can be determined with respect to one or more GPS tracked objects in the location from which other relative positions of real and virtual objects can be identified. Additionally, an IP address of a WiFi hotspot or cellular station to which the physical A/V apparatus 1500 has a connection can identify a location. Additionally, identifier tokens may be exchanged between physical A/V apparatus 1500 via infra-red, Bluetooth or WUSB. The range of the infra-red, WUSB or Bluetooth signal can act as a predefined distance for determining proximity of another user. Maps and map updates, or at least object identification data may be exchanged between physical A/V apparatus via infra-red, Bluetooth or WUSB as the range of the signal allows.

The scene mapping engine 3706 identifies the position and tracks the movement of real and virtual objects in the volumetric space based on communications with the object recognition engine 1792 of the image and audio processing engine 1791 and one or more executing applications generating virtual objects.

The object recognition engine 1792 of the image and audio processing engine 1791 detects, tracks and identifies real objects in the display field of view and the 3D environment of the user based on captured image data and captured depth data if available or determined depth positions from stereopsis. The object recognition engine 1792 distinguishes real objects from each other by marking object boundaries and comparing the object boundaries with structural data. One example of marking object boundaries is detecting edges within detected or derived depth data and image data and connecting the edges. Besides identifying the type of object, an orientation of an identified object may be detected based on the comparison with stored structure data 2700, object reference data sets 3718 or both. One or more databases of structure data 2700 accessible over one or more communication networks 1560 may include structural information about objects. As in other image processing applications, a person can be a type of object, so an example of structure data is a stored skeletal model of a human which may be referenced to help recognize body parts. Structure data 2700 may also include structural information regarding one or more inanimate objects in order to help recognize the one or more inanimate objects, some examples of which are furniture, sporting equipment, automobiles and the like.

The structure data 2700 may store structural information as image data or use image data as references for pattern recognition. The image data may also be used for facial recognition. The object recognition engine 1792 may also perform facial and pattern recognition on image data of the objects based on stored image data from other sources as well like user profile data 1797 of the user, other users profile data 3722 which are permission and network accessible, location indexed images and 3D maps 3724 and Internet accessible images 3726.

FIG. 18 is a block diagram of one embodiment of a computing system that can be used to implement one or more network accessible computer systems 1512 or a companion processing module 1504 which may host at least some of the software components of computing environment 1754 or other elements depicted in FIG. 17. With reference to FIG. 18, an exemplary system includes a computing device, such as computing device 1800. In its most basic configuration, computing device 1800 typically includes one or more processing units 1802 including one or more central processing units (CPU) and one or more graphics processing units (GPU). Computing device 1800 also includes system memory 1804. Depending on the exact configuration and type of computing device, system memory 1804 may include volatile memory 1805 (such as RAM), non-volatile memory 1807 (such as ROM, flash memory, etc.) or some combination of the two. This most basic configuration is illustrated in FIG. 18 by dashed line 1806. Additionally, device 1800 may also have additional features/functionality. For example, device 1800 may also include additional storage (removable and/or non-removable) including, but not limited to, magnetic or optical disks or tape. Such additional storage is illustrated in FIG. 18 by removable storage 1808 and non-removable storage 1810.

Device 1800 may also contain communications connection(s) 1812 such as one or more network interfaces and transceivers that allow the device to communicate with other devices. Device 1800 may also have input device(s) 1814 such as keyboard, mouse, pen, voice input device, touch input device, etc. Output device(s) 1816 such as a display, speakers, printer, etc. may also be included. These devices are well known in the art so they are not discussed at length here.

While temple arms providing a long axis compression in a A/R HMD is described herein, one of ordinary skill in the art would understand that temple arms as described herein may also be used in a V/R HMD embodiment as well.

Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. An apparatus to position a device on a head of a user, the apparatus comprising:
    a first temple arm to be coupled to the device; and
    a second temple arm to be coupled to the device,
    wherein each of the first and second temple arms include,
    a compression material, extending over at least a portion of the lengths of the first and second temple arms, to exert a compression force toward a long axis of the head,
    a spine layer, coupled to the compression material and extending over the same portion of the lengths of the first and second temple arms, to limit a displacement of the compression material toward the long axis; and
    an interface material that is positioned on an inner side of each of the first and second temple arms so that at least a portion of the interface material contacts the head when the first and second temple arms are positioned on the head.

2. The apparatus of claim 1, wherein the device is a near-eye display, and wherein the first and second temple arms are coupled to the near-eye display, wherein the compression material is spring steel, and wherein at least a portion of the spring steel is positioned adjacent and external to the interface material.

3. The apparatus of claim 2, wherein at least a portion of the spine layer is positioned adjacent and external to the spring steel.

4. The apparatus of claim 3, wherein the spine layer includes a plurality of links coupled together by a plurality of tension links,
    wherein the plurality of tension links includes one of a plurality of tension rods and a cable that weaves through the plurality of links.

5. The apparatus of claim 3, wherein the spine layer includes one of stretchable fibers with interwoven non-stretchable fibers, fabric or dense foam that is partially stretchable until a fixed distance and fabric or dense foam having a plurality of perforations.

6. The apparatus of claim 1, wherein the spine layer is positioned at least partially between the interface material and the compression material,
wherein the spine layer includes a plurality of links having small wedge-shaped gaps and hinges between each pair of links in the plurality of links.

7. An apparatus comprising:
a computing device that provides an electronic signal representing visual information; and
a head mounted display that provides a visual image in response to the electronic signal, wherein the head mounted display includes:
a near-eye display;
a first temple arm coupled to the near-eye display; and
a second temple arm coupled the near-eye display,
wherein each of the first and second temple arms include,
a spring steel to exert a compression force inward;
a spine material coupled to and overlapping the spring steel to limit a displacement of the spring steel; and
an interface material positioned internal to at least a portion of both the spring steel and the spine material.

8. The apparatus of claim 7, wherein at least a portion of the spine material is hard goods positioned external to the interface material and spring steel,
wherein the spine material includes a plurality of links coupled together by a plurality of tension links,
wherein the plurality of tension links includes one of a plurality of tension rods and a cable that weaves through the plurality of links.

9. The apparatus of claim 7, wherein at least a portion of the spine material is soft goods positioned externally to the spring steel,
wherein the spine material includes one of stretchable fibers with interwoven non-stretchable fibers, fabric or dense foam that is partially stretchable until a fixed distance and fabric or dense foam having a plurality of perforations.

10. The apparatus of claim 7, wherein at least a portion of the spine material is hard goods positioned internal to the spring steel and external to the interface material,
wherein the spine material includes a plurality of links having small wedge-shaped gaps and hinges between each pair of links in the plurality of links.

11. A method of manufacturing a pair of temple arms to be coupled to a display that is to be worn on a head, the method comprising:
forming a compression material, overlapping a length of each temple arm of the pair of temple arms, that provides a compression force toward a long axis of the head;
forming a spine material, overlapping the length of each temple arm of the pair of temple arms, that limits a displacement of the compression material toward the long axis; and
forming an interface material, in each temple arm of the pair of temple arms, that provides an interface between each temple arm and the head.

12. The method of claim 11, wherein the each temple arm in the pair of temple arms includes a plurality of sections having different amounts of flexibility and preloading.

13. The method of claim 11, wherein forming the spine material includes one of forming a spine layer that include hard goods at least partially external to the compression material and forming a spine layer that includes soft goods at least partially external to the compression material,
wherein the forming compression material includes forming spring steel.

14. The method of claim 13, wherein the forming the spine material that includes hard goods includes forming a plurality of links connected by a plurality of tension links.

15. The method of claim 14, wherein the a link in the plurality of links is made from one of molded plastic and cast or formed metal,
wherein a tension link in the plurality of tension links include one of a rod shaft, formed sheet metal, molded polymer, composite material and cable.

16. The method of claim 13, wherein the forming the spine layer that includes soft goods includes forming one of fabric that has stretchable fibers interwoven with non-stretchable fibers, fabric or dense foam having a perforation pattern, and fabric or dense foam that is stretchable up to a predetermined percentage of the fabric or dense foam.

17. The method of claim 13, wherein forming the spine layer that includes hard goods includes forming a plurality of wedge-shaped gaps in between a plurality of links.

18. The method of claim 11, wherein forming the spine material includes forming a spine layer at least partially in between an interface layer of the interface material and a compression layer of the compression material.

19. The method claim 11, wherein forming the compression material include forming a looped wire spring and forming the spine material includes forming a spine layer in between the looped wire spring.

20. The method of claim 11, wherein forming the interface material includes forming one of compression-molded foam, cast silicone, and a padded material.

* * * * *